United States Patent
Li et al.

(10) Patent No.: US 10,825,374 B2
(45) Date of Patent: Nov. 3, 2020

(54) LIQUID CRYSTAL DRIVE CIRCUIT, BACKLIGHT CIRCUIT, TERMINAL, DEVICE AND METHOD

(71) Applicant: Xiaomi Inc., Beijing (CN)

(72) Inventors: Guosheng Li, Beijing (CN); Wei Feng, Beijing (CN); Shanrong Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 57 days.

(21) Appl. No.: 15/146,358

(22) Filed: May 4, 2016

(65) Prior Publication Data

US 2017/0046997 A1 Feb. 16, 2017

(30) Foreign Application Priority Data

Aug. 13, 2015 (CN) .......................... 2015 1 0498541

(51) Int. Cl.
*G09G 3/20* (2006.01)
*G09G 3/36* (2006.01)
*G09G 3/34* (2006.01)
*G02F 1/133* (2006.01)
*G02F 1/1343* (2006.01)
(Continued)

(52) U.S. Cl.
CPC .......... *G09G 3/2007* (2013.01); *G02F 1/1368* (2013.01); *G02F 1/13306* (2013.01); *G02F 1/134336* (2013.01); *G02F 1/136286* (2013.01); *G09G 3/3406* (2013.01); *G09G 3/3426* (2013.01); *G09G 3/3677* (2013.01); *G09G 3/3688* (2013.01); *G09G 2300/0426* (2013.01); *G09G 2310/027* (2013.01); *G09G 2310/04* (2013.01); *G09G 2330/021* (2013.01)

(58) Field of Classification Search
CPC .. G09G 3/3406; G09G 3/3426; G09G 3/3677; G09G 3/3688; G09G 2330/021
See application file for complete search history.

(56) References Cited

U.S. PATENT DOCUMENTS 5,357,290 A 10/1994 Horibe
5,625,376 A 4/1997 Maekawa
(Continued)

FOREIGN PATENT DOCUMENTS

| CN | 1389846 A | 1/2003 |
|---|---|---|
| CN | 1499462 A | 5/2004 |

(Continued)

OTHER PUBLICATIONS

International Search Report dated Apr. 29, 2016 for International Application No. PCT/CN2015/098855, 5 pages.
(Continued)

*Primary Examiner* — Lixi C Simpson
(74) *Attorney, Agent, or Firm* — Brinks Gilson & Lione

(57) ABSTRACT

A liquid crystal driver circuit may include a screen including a plurality of liquid crystal units distributed as an array. The array may include m rows of liquid crystal units along a row direction, and n columns of liquid crystal units along a column direction, wherein m is an integer and n is an integer. The screen may also include n data lines, respectively connected to the n columns of liquid crystal units along the column direction; and at least one data line switch, each connected to a corresponding data line of the n data lines.

14 Claims, 8 Drawing Sheets

(51) Int. Cl.
*G02F 1/1362* (2006.01)
*G02F 1/1368* (2006.01)

(56) References Cited

U.S. PATENT DOCUMENTS

| | | | | |
|---|---|---|---|---|
| 6,225,969 | B1* | 5/2001 | Ishii | G09G 3/367 |
| | | | | 345/100 |
| 2002/0196243 | A1 | 12/2002 | Morita | |
| 2005/0225526 | A1* | 10/2005 | Chiu | G09G 3/3688 |
| | | | | 345/98 |
| 2005/0231494 | A1 | 10/2005 | Kumada et al. | |
| 2006/0050065 | A1 | 3/2006 | Maki | |
| 2006/0227122 | A1* | 10/2006 | Proctor | G09G 3/20 |
| | | | | 345/204 |
| 2009/0168455 | A1 | 7/2009 | Kim et al. | |
| 2009/0284500 | A1 | 11/2009 | Yamashita | |
| 2011/0001693 | A1 | 1/2011 | Kim et al. | |
| 2012/0113170 | A1 | 5/2012 | Igarashi | |
| 2013/0106819 | A1* | 5/2013 | Lee | G09G 3/003 |
| | | | | 345/211 |
| 2013/0128129 | A1* | 5/2013 | Kuromizu | G02B 6/009 |
| | | | | 348/790 |
| 2014/0132842 | A1 | 5/2014 | Tsuchiya et al. | |
| 2014/0168126 | A1* | 6/2014 | Yu | G06F 3/0488 |
| | | | | 345/173 |
| 2015/0022561 | A1* | 1/2015 | Ikeda | G09F 9/301 |
| | | | | 345/690 |
| 2015/0145838 | A1 | 5/2015 | Xu | |

FOREIGN PATENT DOCUMENTS

| | | | |
|---|---|---|---|
| CN | 1659611 | A | 8/2005 |
| CN | 101932968 | A | 12/2010 |
| CN | 102087818 | A | 6/2011 |
| CN | 102474669 | A | 5/2012 |
| CN | 103544920 | A | 1/2014 |
| CN | 104505016 | A | 4/2015 |
| CN | 104700798 | A | 6/2015 |
| CN | 105070259 | A | 11/2015 |
| DE | 694 16 041 | T2 | 8/1999 |
| EP | 0 632 646 | A2 | 1/1995 |
| EP | 2 238 502 | A1 | 10/2010 |
| EP | 2 587 475 | A1 | 5/2013 |
| JP | 07-020816 | A | 1/1995 |
| JP | 2003-029715 | A | 1/2003 |
| JP | 2003-058130 | A | 2/2003 |
| JP | 2006-003923 | A | 1/2006 |
| JP | 2006-078556 | A | 3/2006 |
| JP | 2007-322747 | A | 12/2007 |
| JP | 2008-076784 | A | 4/2008 |
| JP | 2009-276547 | A | 11/2009 |
| JP | 2011-508405 | A | 3/2011 |
| JP | 5427734 | B2 | 2/2014 |
| KR | 10-2009-0071488 | A | 7/2009 |
| KR | 10-2011-0038665 | A | 4/2011 |
| KR | 10-2011-0060658 | A | 6/2011 |
| KR | 10-2012-0061097 | A | 6/2012 |
| KR | 10-2013-0045582 | A | 5/2013 |
| RU | 2 397 552 | C1 | 8/2010 |
| WO | WO 2009/084894 | A1 | 7/2009 |

OTHER PUBLICATIONS

Office Action dated May 22, 2018 for Japanese Application No. 2017-533679, 3 pages.
English Translation of International Search Report dated Apr. 29, 2016 for International Application No. PCT/CN2015/098855, 6 pages.
Office Action dated Sep. 4, 2017 for Chinese Application No. 201510498541.6, 8 pages.
Office Action dated Sep. 15, 2017 for Japanese Application No. 2017-533679, 5 pages.
Office Action dated Mar. 7, 2017 for Korean Application No. 10-2016-7004563, 11 pages.
Office Action dated Jul. 12, 2017 for Russian Application No. 2016113189/08, 11 pages.
Partial European Search Report dated Jun. 15, 2016 for European Application No. 16168514.4, 7 pages.

* cited by examiner

LIQUID CRYSTAL DRIVE CIRCUIT, BACKLIGHT CIRCUIT, TERMINAL, DEVICE AND METHOD

PRIORITY STATEMENT

This application is based upon and claims priority to Chinese Patent Application No. 201510498541.6, filed Aug. 13, 2015, the entire contents of which are incorporated herein by reference.

TECHNICAL FIELD

The present disclosure relates to technical field of display, and more particularly, to a liquid crystal driver circuit, a backlight circuit, a terminal, a device and a method.

BACKGROUND

At present, liquid crystal displays of mobile terminals become bigger and bigger.

Because a larger liquid crystal display consumes more electricity, the related art provides a window display mode for a mobile terminal. Under the window display mode, information will only be displayed in a predetermined window region, rather than be displayed on the entire display area of the liquid crystal display. The window region is usually a relatively small rectangle region. Other region of the liquid crystal display excluding the window region remain black, so that power consumption is reduced.

SUMMARY

The present disclosure provides a liquid crystal driver circuit, a backlight circuit, a terminal, a device and a method. The relative technical solutions are as follows.

According to an aspect of the present disclosure, a liquid crystal driver circuit may include a screen including a plurality of liquid crystal units distributed as an array. The array may include m rows of liquid crystal units along a row direction, and n columns of liquid crystal units along a column direction, wherein m is an integer and n is an integer. The screen may also include n data lines, respectively connected to the n columns of liquid crystal units along the column direction; and at least one data line switch, each connected to a corresponding data line of the n data lines.

According to another aspect of the present disclosure, a screen of a terminal may include a plurality of liquid crystal units distributed as an array of m rows of liquid crystal units along a row direction and n columns of liquid crystal units along a column direction, wherein m is an integer and n is an integer. A window region in the screen may include j columns of the liquid crystal units and k rows of the liquid crystal units, wherein j is an integer smaller than n and k is an integer smaller than m. The screen may further include a first type of j data lines respectively connected to the j columns of the liquid crystal units in the window region, a second type of n−j data lines respectively connected to the columns of the n columns of liquid crystal units outside the window region, n−j data line switches respectively connected to the n−j data lines, a data driver chip including n data pins respectively connected to the j data lines and the n−j data line switches, a first type of k scanning lines respectively connected to the k rows of liquid crystal units in the window region, a second type of m−k scanning lines respectively connected to the rows of the m rows of liquid crystal units outside the window region, and a scanning driver chip including m scanning pins respectively connected to a corresponding scanning lines of the m scanning lines.

According to yet another aspect of the present disclosure, a method for displaying an image on the screen may include: to each of the k first type of scanning lines, sending, by the scanning driver chip, a scanning voltage; setting, by the data driver chip, the n−j data line switches to an off state; and to each of the j second type of data lines, sending, by the data driver chip, a gray-scale voltage.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Figure 1:
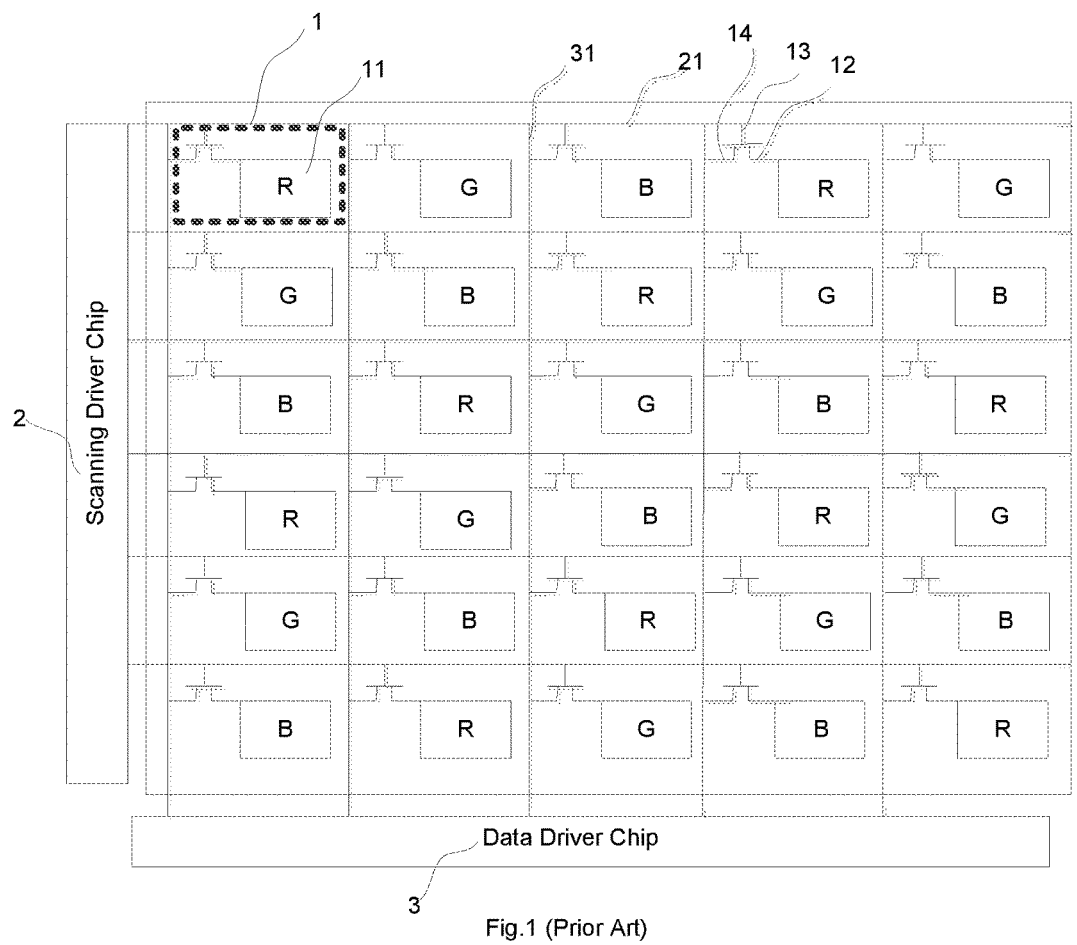
FIG. 1 is a structure diagram of a liquid crystal driver circuit provided by prior art.

FIG. 1 is a structure diagram of a liquid crystal driver circuit provided by the background art. As shown in FIG. 1, the liquid crystal driver circuit includes m×n liquid crystal units 1, a scanning driver chip 2, m scanning lines 21, a data driver chip 3 and n data lines 31.

The liquid crystal units 1 are arranged in an array of m rows and n columns. Each liquid crystal unit 1 includes: a liquid crystal pixel electrode 11 and a TFT (Thin Film Transistor) switching element. The TFT switching element includes a source 12, a gate 13 and a drain 14. The liquid crystal pixel electrode 11 is connected to the source 12 in the TFT switching element. The liquid crystal pixel electrode 11 may be a red liquid crystal pixel electrode R, a green liquid crystal pixel electrode G or a blue pixel electrode B.

The scanning driver chip 2 includes m scanning pins, and each scanning pin is connected to one scanning line 21. Each row of liquid crystal units 1 corresponds to one scanning line 21, and the scanning line 21 is connected to the gates 13 of the liquid crystal units 1 in the corresponding row.

The data driver chip 3 includes n data pins, and each data pin is connected to one data line. Each column of liquid crystal units 1 corresponds to one data line 31, and the data line 31 is connected to the drains 14 of the liquid crystal units 1 in the corresponding column.

When the liquid crystal driver circuit is in operation, the scanning driver chip 2 sends a scanning signal to the scanning lines 21 row by row with regard to a frame of image. When the scanning line 21 receives the scanning signal, it sets the corresponding row of liquid crystal units in a operating state. Meanwhile, the data driver chip 3 sends a gray-scale voltage of pixels corresponding to the row of liquid crystal units to the corresponding drain 14 through the data line 31, so that the data driver chip 3 saves the corresponding gray-scale voltage in the liquid crystal pixel electrode 11, in this way, each liquid crystal pixel electrode 11 displays a gray-scale at a corresponding level, thus displaying one frame of image.

In the liquid crystal driver circuit described in FIG. 1, under a window display mode, target content will be displayed in a window region, and the remainder non-window region will display nothing, i.e., be in black. The window region refers to a partial region in a liquid crystal display where target content needs to be displayed. The window region is smaller than the entire display region of the liquid crystal display, and the window region is usually a rectangle shape. The target content may be system time, short message notification, or the like.

However, with regard to the liquid crystal driver circuit, under the window display mode, all the data lines 2 and the scanning lines 3 are in a normal operating state, i.e., although the non-window region is displayed as black, it still consumes energy as the non-window region is also in operating state. As a result, the power consumption of the liquid crystal display device is still large.

Figure 2A:
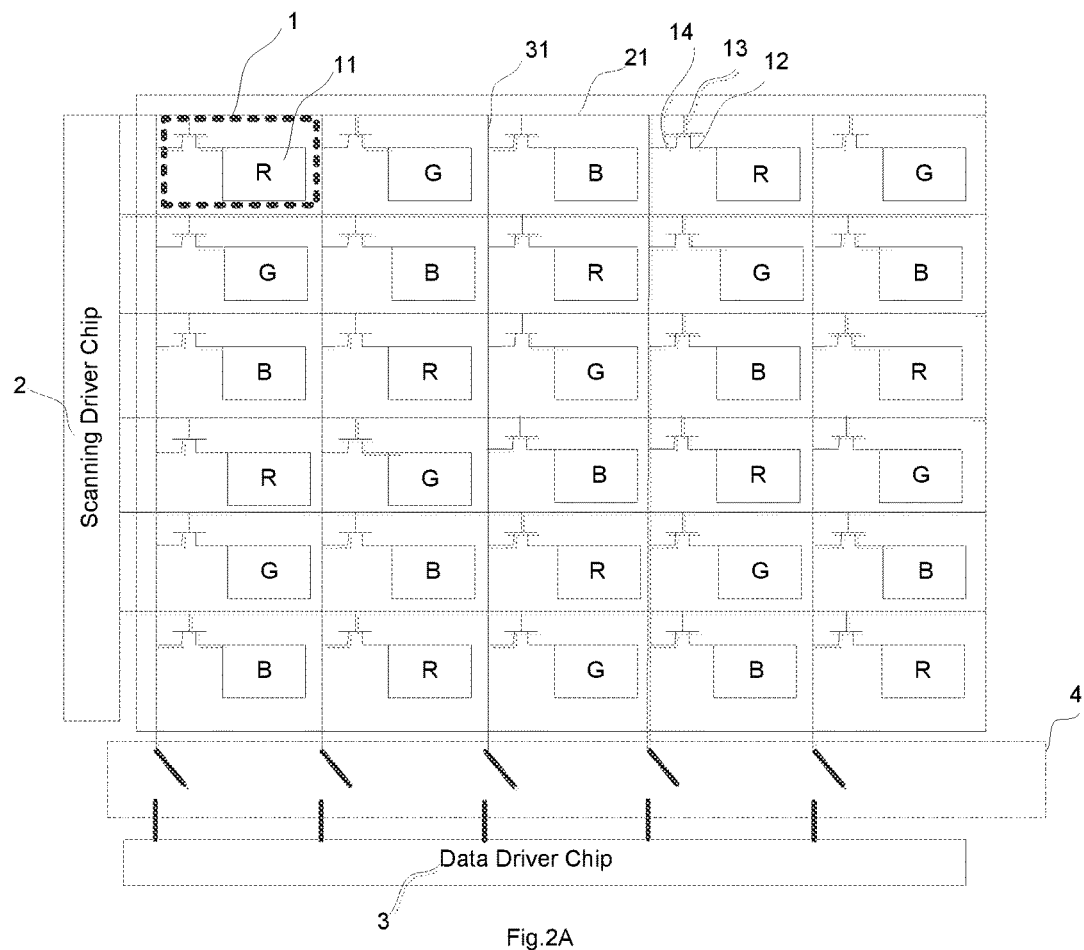
FIG. 2A is a structure diagram of a liquid crystal driver circuit, according to an exemplary embodiment of the present disclosure.
Figure 2B:
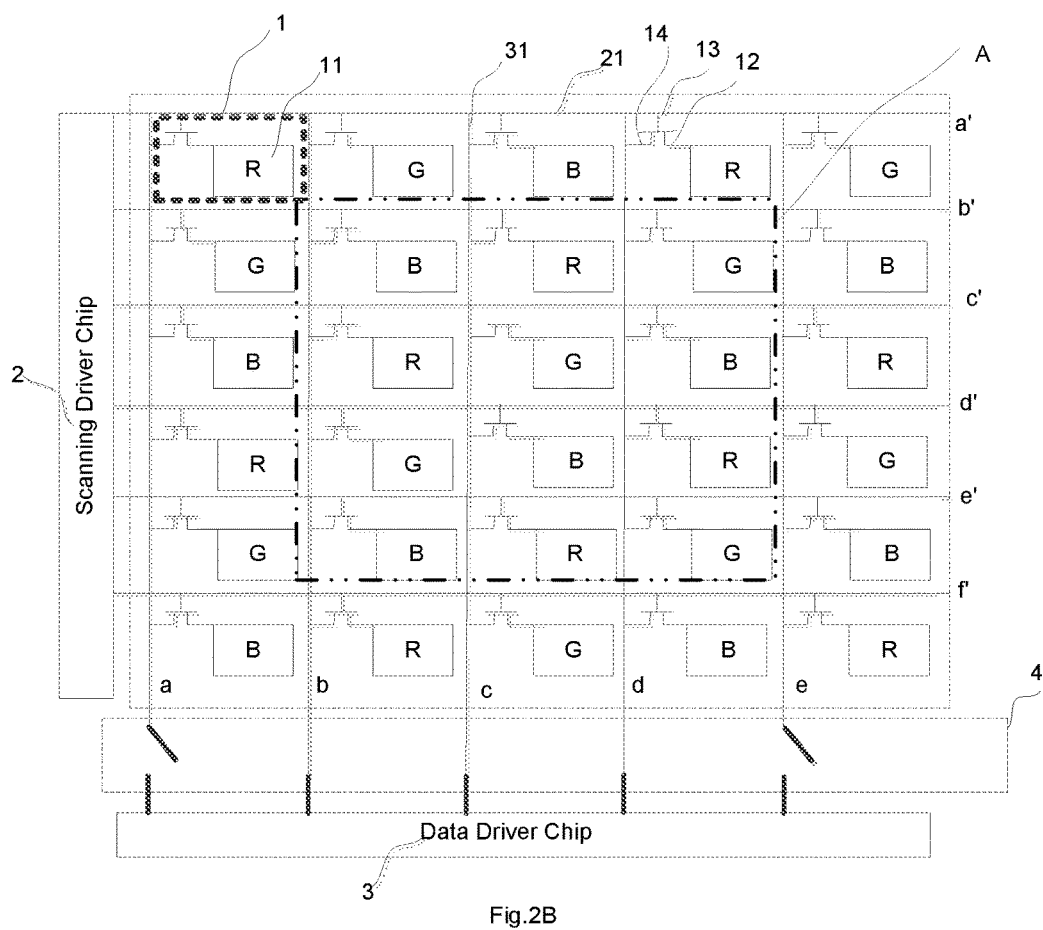
FIG. 2B is a structure diagram of a liquid crystal driver circuit, according to another exemplary embodiment of the present disclosure.

FIG. 2A and FIG. 2B are block diagrams of a liquid crystal driver circuit, according to an exemplary embodiment. As shown in FIG. 2A, the liquid crystal driver circuit may include a scanning driver chip 2, a data driver chip 3, at least one data line switch 4, and a screen. The screen may include m×n liquid crystal units 1 distributed by rows and columns, m scanning lines 21 distributed by rows, and n data lines 31 distributed by columns. Here, m and n are two integers.

The liquid crystal units 1 are arranged in an array including m rows and n columns. Each liquid crystal unit 1 includes: a liquid crystal pixel electrode 11 and a TFT switching element. The TFT switching element includes a source 12, a gate 13 and a drain 14. The liquid crystal pixel electrode 11 is connected to the source 12 in the TFT switching element. The liquid crystal pixel electrode 11 may be one of a red liquid crystal pixel electrode R, a green liquid crystal pixel electrode G, or a blue pixel electrode B.

The scanning driver chip 2 includes m scanning pins, and the scanning pins are correspondingly connected to the scanning lines 21 one by one. Each row of liquid crystal units 1 correspond to one scanning line 21, and the scanning line 21 is connected to the gates 13 of the liquid crystal units 1 in the corresponding row.

The data driver chip 3 includes n data pins, and the data pins are connected to the data lines 31 one by one. Each column of liquid crystal units 1 corresponds to one data line 31, and each data line 31 is connected to the drains 14 of the liquid crystal units 1 in the corresponding column.

The data line switch 4 is arranged between at least one of the data lines 31 and the corresponding data pins of the driver chip 3.

In the embodiment of FIG. 2A, n data line switches 4 are arranged between the data lines 31 and the data pins, i.e., there is a data line switches 4 arranged between each data line 31 and the corresponding data pin of the data driver chip 3. The data line switch 4 further includes a control terminal (not shown in the drawing). For example, each data line switch 4 is switched on or off according to a received control signal. When the data line switch 4 is switched on, the corresponding data line 31 is in a operating state, and can receive the gray-scale voltage sent from the data driver chip 3. When the data line switch 4 is switched off, the corresponding data line 31 is in a non-operating state, and cannot receive the gray-scale voltage sent from the data driver chip 3.

In the embodiment of FIG. 2B, the data line switch 4 is arranged only between a data line 31 that satisfies a first condition and the corresponding data pin, wherein the first condition is that the column of the data line 31 has no intersection with the window region (i.e., not connected to the window region).

For example, in FIG. 2B, the liquid crystal driver circuit includes a screen of 30 liquid crystal units 11, 6 scanning lines a', b', c', d', e', f', and 5 data lines a, b, c, d, e, i.e., m=6 and n=5. A window region A in the screen includes 12 liquid crystal units 11, 4 scanning lines b', c', d', e' (i.e., p=4), and 3 data lines b, c, d (i.e., j=3). Thus among the 5 data lines, the window region A has intersections with j=3 data lines b, c, d (i.e., first type data lines) in the middle, and does not have intersections with k=2 data lines a, e (i.e., second type data lines). Accordingly, the data line switches 4 are provided in each of the second type data lines, i.e., a data line switch 4 is arranged between the data line a and the corresponding data pin of the data driver chip 3, and a data line switch 4 is arranged between the data line e and the corresponding data pin of the data driver chip 3.

Figure 3:
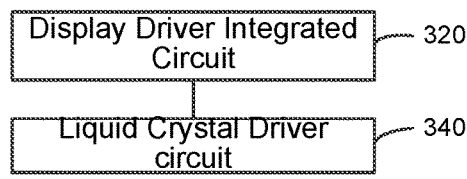
FIG. 3 is a structure diagram of a terminal, according to an exemplary embodiment of the present disclosure.

FIG. 3 is a structure diagram of a terminal, according to an exemplary embodiment of the present disclosure. The terminal includes a DDIC (Display Driver Integrated Circuit) 320 and a liquid crystal driver circuit 340. The liquid crystal driver circuit 340 may be the liquid crystal driver circuit as shown in FIG. 2A or FIG. 2B. Accordingly, the DDIC 320 may be electrically connected to the scanning driver chip, the data driver chip and the data line switch in the liquid crystal driver circuit 340 respectively.

Figure 4:
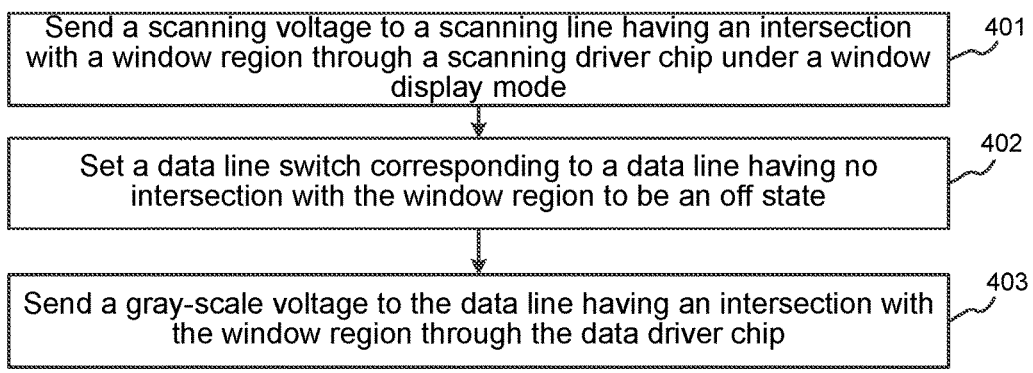
FIG. 4 is a flow chart of a display method, according to an exemplary embodiment of the present disclosure.

FIG. 4 is a flow chart of a display method, according to an exemplary embodiment of the present disclosure. The method may be implemented in the terminal as shown in FIG. 3 and the liquid crystal driver circuits as shown in FIG. 2A and FIG. 2B. The method may include the following steps.

In step 401, sending a scanning voltage to a scanning line having an intersection with a window region through a scanning driver chip under a window display mode.

Under the window display mode, a DDIC sends the scanning voltage to the scanning line having an intersection with the window region through the scanning driver chip. The window region refers to a partial region in a liquid crystal display where target content needs to be displayed. The window region is smaller than the entire display region of the liquid crystal display, and is normally a rectangle shape. The target content may be system time, short message notification, or the like.

In step 402, setting a data line switch to an off state wherein the data line switch corresponds to a second type data line having no intersection with the window region.

Because the second type data line having no intersection with the window region does not need to operate, the DDIC also sets the data line switch corresponding to the second type data line having no intersection with the window region to be an off state.

In step 403, sending a gray-scale voltage to a first type data line through the data driver chip, wherein the first type data line has an intersection with the window region.

When a scanning line is in a scanned state, the DDIC may also generate gray-scale voltages corresponding to each first type data line according to content to be displayed with regard to one row of liquid crystal units corresponding to this scanning line, and send the gray-scale voltage to the first type data line having an intersection with the window region through the data driver chip, so as to display the display content in this row.

The liquid crystal driver circuit displays one frame of the content every time when the DDIC scans the scanning lines in each row once. To this end, the DDIC may scan only the first type scanning lines. Alternatively, the DDIC may scan every scanning line on the screen, and the liquid crystal driver circuit only send corresponding grey scale voltages to the first type scanning lines.

It should be noted that the embodiment does not define the performing sequence relationship between step 402 and steps 401 and 403.

In conclusion, according to the display method provided by the embodiments of present disclosure, the scanning voltage is sent to the scanning line having an intersection with the window region through the scanning driver chip under the window display mode; the data line switch corresponding to the data line having no intersection with the window region is set into the off state; and the gray-scale voltage is sent to the data line having an intersection with the window region through the data driver chip; therefore, a power waste problem caused by that both the scanning lines and the data lines in a non-window region are in a operating state under the window display mode is solved, and the following effects are achieved: only the scanning lines and the data lines having an intersection with the window region are in a operating state under the window display mode, thus reducing the power consumption.

Figure 5:
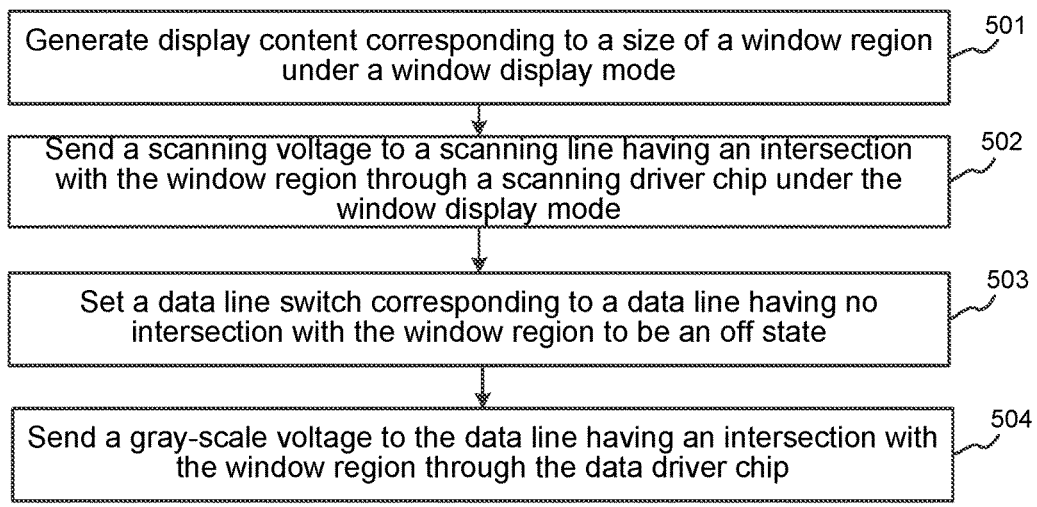
FIG. 5 is a flow chart of a display method, according to another exemplary embodiment of the present disclosure.

FIG. 5 is a flow chart of a display method, according to an exemplary embodiment of the present disclosure. The method may be implemented in the terminal as shown in FIG. 3 and the liquid crystal driver circuits as shown in FIG. 2A and FIG. 2B. The method may include the following steps.

In step 501, generating display content corresponding to a size of a window region under a window display mode.

Under the window display mode, a DDIC only needs to generate display content corresponding to the size of the window region. For instance, the size of the window region is 320 pixels×240 pixels, then only display content of 320 pixels×240 pixels needs to be generated.

In step 502, sending a scanning voltage to a first type scanning line having an intersection with the window region through a scanning driver chip under the window display mode.

Under the window display mode, the DDIC reads a position of the window region, detects and/or determines the scanning line (i.e., a first type scanning line) having an intersection with the window region (e.g., connected with the window region) according to the position of the window region, and sends the scanning voltage to the first type scanning line through the scanning driver chip.

For example, assuming that there are 10 scanning lines in the scanning driver chip from top to bottom, and the position of the window region is from the second row to the fifth row, then the DDIC only needs to send the scanning voltage to the second to fifth scanning lines through the scanning driver chip.

For example, the DDIC controls an output start position and output times of the scanning voltage through the scanning driver chip.

The output start position is a scanning pin corresponding to the first first type scanning line according to a sequence from top to bottom; and the output times is equal to the number of the first type scanning lines.

The output start position refers to the first type scanning line at the top end of the window region; and the output times refers to the number of the first type scanning lines totally occupied by the window region.

For instance: assuming that there are 10 scanning lines in the scanning driver chip from top to bottom, and the position of the window region is located from the second row to the fifth row, then the output start position refers to the second scanning line, and the output times is three.

In step 503, setting a data line switch corresponding to a second type data line to an off state, wherein the second type data line is a data line having no intersection with the window region is set to be an off state.

The second type data line refers to the data line not occupied by and not connected to the window region in the column direction; and setting the second type data line to be the off state is to set the second type data line in a state of open circuit.

For instance: assuming that there are 10 scanning lines in the scanning driver chip from top to bottom, and the window region is located from the third row to the sixth row, then the second type data lines are the first, second and 7-10 data lines from left to right. That is, the data line switches corresponding to these data lines are set to be an off state.

In step 504, sending a gray-scale voltage to a first type data line having an intersection with the window region through the data driver chip.

When a first type scanning line is in a scanned state, the DDIC may also generate gray-scale voltages corresponding to each of the first type data line according to content to be displayed with regard to a row of liquid crystal units corresponding to this scanning line, and send a corresponding gray-scale voltage to each of the first type data lines through the data driver chip, so as to display the display content in each row.

The liquid crystal driver circuit displays one frame of the content every time when the DDIC scans the scanning lines in each row for once.

It should be noted that the embodiment does not define the performing sequence relationship between step 503 and steps 502 and 504.

In conclusion, according to the display method provided by the embodiment of present disclosure, the scanning voltage is sent to the scanning line having an intersection with the window region through the scanning driver chip under the window display mode; the data line switch corresponding to the data line having no intersection with the window region is set to be the off state; and the gray-scale voltage is sent to the data line having an intersection with the window region through the data driver chip; therefore, a power waste problem caused by that both the scanning line and the data line of a non-window region are in a operating state under the window display mode is solved, and the following effects are achieved: only the scanning line and the data line having an intersection with the window region are in a operating state under the window display mode, thus reducing the power consumption.

According to the embodiment, by only generating the display content having the same size as that of the window region without generating the display content of the entire screen, the calculation amount is also effectively reduced, and the power consumption is reduced.

Figure 6A:
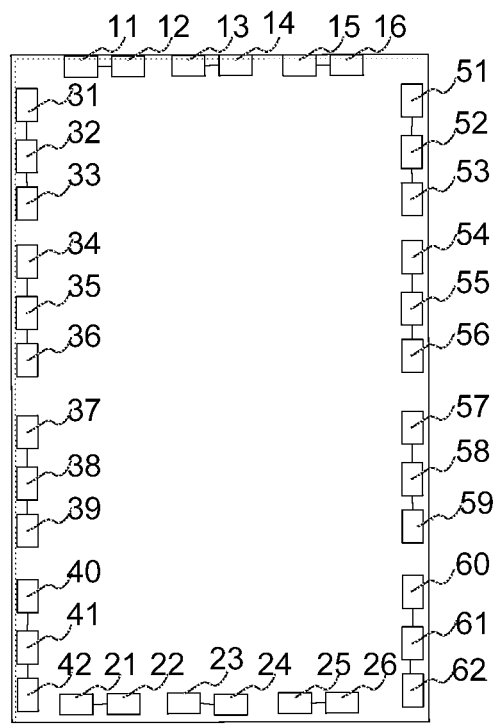
FIG. 6A is a structure diagram of a backlight circuit, according to an exemplary embodiment.
Figure 6B:
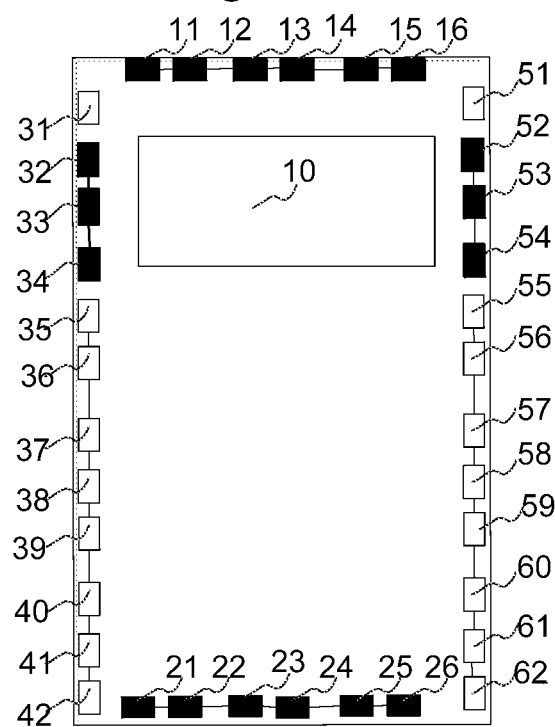
FIG. 6B is a structure diagram of a backlight circuit, according to another exemplary embodiment.
Figure 6C:
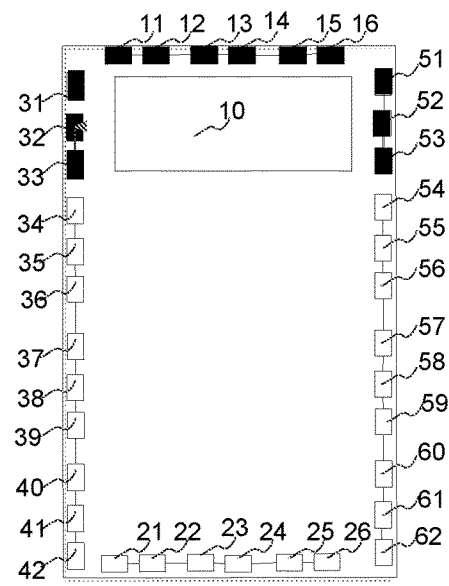
FIG. 6C is a structure diagram of a backlight circuit, according to further another exemplary embodiment.

In addition to the features shown above, exemplary embodiments in the present disclosure also includes special backlight circuits to save energy. FIG. 6A to FIG. 6C are structure diagrams of a backlight circuit, according to one exemplary embodiment. As shown in FIG. 6A, the backlight circuit may include row backlights 11-16 and 21-26, row backlight strings 11-12, 13-14, 15-16, 21-22, 23-24, and 25-26, column backlights 31-42 and 51-62, and column backlight strings 31-33, 34-36, 37-39, 40-42, 51-53, 54-56, 57-59, and 60-62.

The several row backlights are distributed in a row along the row border region of a liquid crystal display, e.g., the upper and lower border of the liquid crystal display as shown in FIG. 6A. The several column backlights are distributed in a column along the column border region of the liquid crystal display, e.g., the left and right border of the liquid crystal display. At least two of the several row backlights in the row border region of the liquid crystal display are connected in series so as to form a row backlight string. At least two of several column backlights in the column border region of the liquid crystal display are connected in series so as to form a column backlight string.

In the embodiment of FIG. 6A, there are 12 row backlights in the row direction, which are row backlights 11 to 16 on the top border in the row direction, and row backlights 21 to 26 on the bottom border in the row direction. Every two adjacent row backlights in the row direction are connected in series to form a row backlight string; that is, the row backlight 11 and the row backlight 12, the row backlight 13 and the row backlight 14 as well as the row backlight 15 and the row backlight 16 on the top border in the row direction are respectively connected in series to form row backlight strings; and the row backlight 21 and the row backlight 22, the row backlight 23 and the row backlight 24 as well as the row backlight 25 and the row backlight 26 on the bottom border in the row direction are connected in series to form row backlight strings, wherein the total six row backlight strings are uniformly distributed in the row border region of the liquid crystal display.

There are 24 column backlights in the column direction, which are column backlights 31 to 42 on a left border in the column direction and column backlights 51 to 62 on the right border in the column direction. Every three adjacent column backlights in the column direction are connected in series to form a column backlight string; that is, column backlights 31 to 33, column backlights 34 to 36, column backlights 37 to 39 and column backlights 40 to 42 on the left border in the column direction are respectively connected in series to form column backlight strings, wherein the total eight column backlight strings are uniformly distributed in the column border region of the liquid crystal display.

In the embodiment of FIG. 6B, at least two of the row backlights are connected in series to form a row backlight string only when they satisfy a second condition, wherein the second condition is that the positions of the at least two of the row backlights have an intersection with the window region in the column direction, or, have no intersection with the window region in the column direction.

Further, the second condition may also include that a distance between each of the at least two of the row backlights and the window region is smaller than a predetermined distance. The predetermined distance may be 2 cm, 5 cm, or a different value. For example, as shown in FIG. 6B, the row backlights 11, 12, 13, 14, 15, 16 has intersection with the window region 10 along the column (vertical) direction, and their respective distance from the window region 10 may be smaller than the predetermined distance. Thus they may be connected in series to form a row backlight string. Similarly, the row backlights 21, 22, 23, 24, 25, 26 has intersection with the window region 10 along the column (vertical) direction, and their respective distance from the window region 10 may be smaller than the predetermined distance. Thus they may be connected in series to form a row backlight string. However, if the distance between the row backlights 21, 22, 23, 24, 25, 26 and the window region 10 is larger than the predetermined distance, the row backlights 21, 22, 23, 24, 25, 26 may not be connected to form a row backlight string.

The plurality of column backlights may be categorized into 2 groups depending on their position along the border of the liquid crystal display. Those column backlights that have intersection with the window region along the row direction may belong to a third group, and those column backlights that do not have intersection with the window region along the row direction may belong to a fourth group. In the embodiment of FIG. 6C, at least 2 of the column backlights are selected to be connected in series to form a column backlight string. Candidate column backlights in a column backlight string belong to the same group, either the third group or the fourth group. In other words, only at least two of the column backlights satisfying a third condition are connected in series to form a column backlight string, wherein the third condition is that both the positions of the at least two of the column backlights in the row direction have an intersection with the window region, or, both have no intersection with the window region.

For example, in FIG. 6C, the window region 10 has an intersection with all the positions (from left to right in the row direction) of column backlights 31, 32, and 33 on the left border in the column direction of the liquid crystal display. Therefore, the column backlights 31, 32, 33 belong to the same third group of backlights and may be connected in series to form a column string. For the column backlights 34 to 42, their positions have no intersection with the window region 10 along the row direction. Therefore, the column backlights 34 to 42 belong to the same fourth group and may be connected in series to form a column backlight string.

Similarly, the window region 10 has an intersection with all the positions (from right to left in the row direction) of row backlights 51, 52, 53 on the right border in the column direction of the liquid crystal display. Therefore, the column backlights 51, 52, 53 belong to the same third group and may be connected in series to form a column backlight string. For the column backlights 54 to 62, their positions have no intersection with the window region 10 along the row direction. Therefore, the column backlights 54 to 62 belong to the same fourth group and may be connected in series to form a column backlight string.

For example, the row backlights with the position having an intersection with the window region are connected in series to form a row backlight string, and the row backlights having no intersection with the window region are connected in series to form another row backlight string. Meanwhile, the column backlights with the positions having an intersection with the window region are connected in series to form a column backlight string, and the column backlights having no intersection with the window region are connected in series to form another row backlight string.

For example, row backlights and column backlights whose positions are intersected with the window region are all connected in series to form a backlight string; and row backlights and column backlights whose positions are not intersected with the window region are all connected in series to form a backlight string.

It should be noted that the embodiment does not define the sizes, arrangement quantity and arrangement density of the row backlights and the column backlights. Different technicians may set them independently according to the demand of detection precision.

Figure 7:
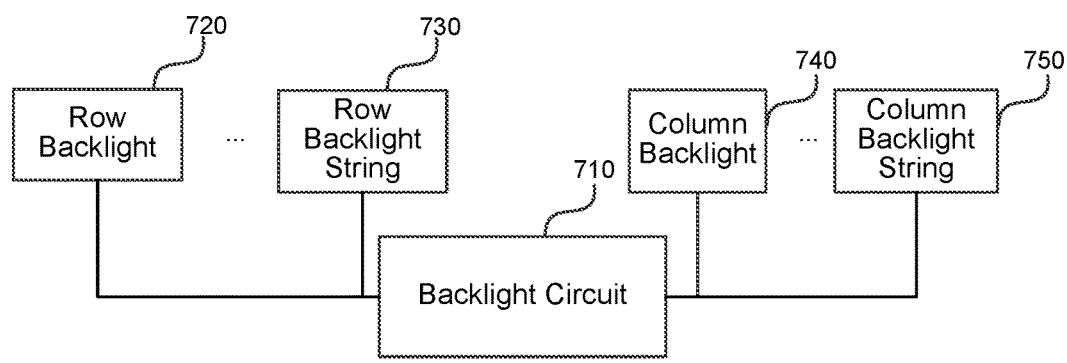
FIG. 7 is a structure diagram of a terminal, according to an exemplary embodiment of the present disclosure.

FIG. 7 is a structure diagram of a terminal, according to an exemplary embodiment of the present disclosure. The terminal may include a backlight circuit 710, at least one row backlight 720, at least one row backlight string 730, at least one column backlight 740, and at least one column backlight string 750.

The backlight circuit may be connected in series to any one of the backlights and backlight strings as shown in any of FIG. 6A to FIG. 6C.

Figure 8:
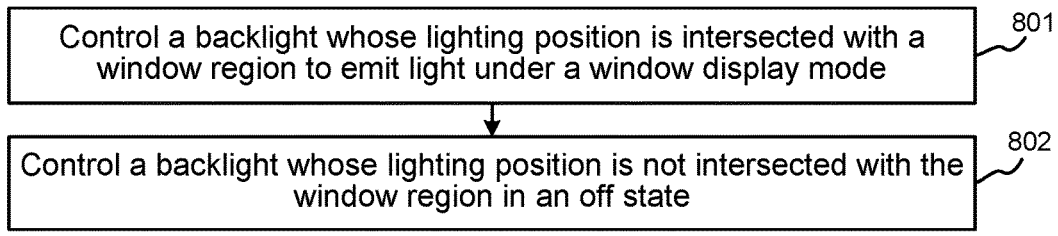
FIG. 8 is a flow chart of a display method, according to an exemplary embodiment of the present disclosure.

FIG. 8 is a flow chart of a display method, according to an exemplary embodiment of the present disclosure. The method may be implemented in the terminal including the backlight circuits as shown in FIG. 7, and may be executed by the backlight circuit 710. The method may include the following steps.

In step 801, under a window display mode, controlling a backlight with a position intersected with a window region to emit light.

Under the window display mode, the backlight circuit controls a row backlight string and a column backlight string having an intersection with the window region to respectively emit light. The window region refers to a partial region in a liquid crystal display for displaying target content. The window region is smaller than the entire display region of the liquid crystal display, and is rectangular usually. The target content may be system time, short message notification, or the like.

In step 802, controlling a backlight with a position having no intersection with the window region be an off state.

The backlight may be a single backlight, and/or a backlight in a row backlight string, and/or a backlight in a column backlight string.

Because neither of the row backlight strings nor the column backlight strings have an intersection with the window region, there is no need to operate these backlights. Therefore, the backlight circuit also sets the row backlights, row backlight strings, column backlight, and the column backlight strings having no intersection with the window region to be an off state.

In conclusion, according to the display method provided by the embodiment of present disclosure, the backlight with the position having an intersection with the window region is controlled to emit light under the window display mode; and the backlight with the position having no intersection with the window region is controlled in an off state; therefore, a power waste problem caused by that both the scanning line and the data line of a non-window region are all in a operating state under the window display mode is solved, and the effect of only making the scanning line and the data line having an intersection with the window region in an operating state under the window display mode is achieved, thus reducing the power consumption.

Figure 9:
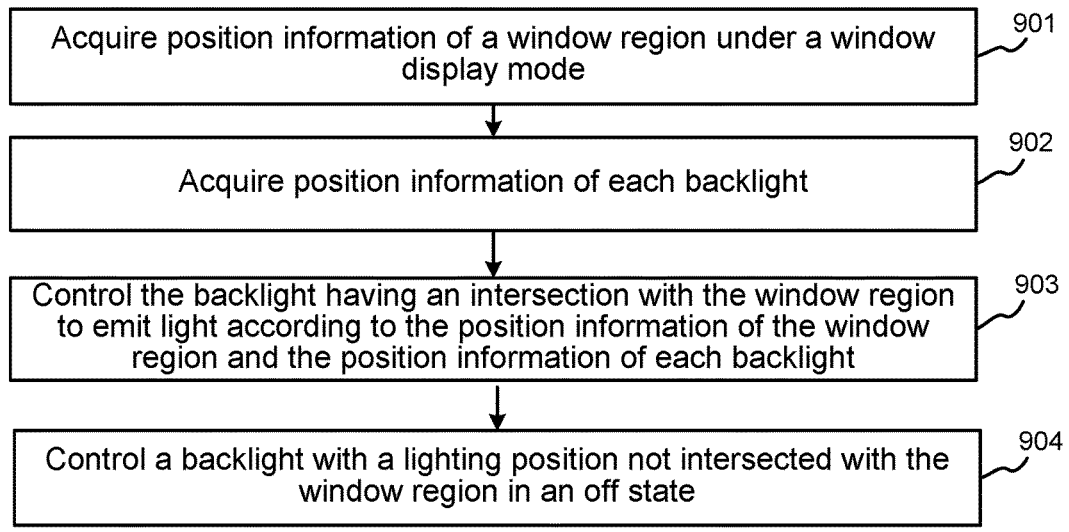
FIG. 9 is a flow chart of a display method, according to an exemplary embodiment of the present disclosure.

FIG. 9 is a flow chart of a display method, according to an exemplary embodiment of the present disclosure. The method may be implemented in the terminal including the backlight circuits as shown in FIG. 7, and may be executed by the backlight circuit 710. The method may include the following steps.

In step 901, acquiring and/or obtaining position information of a window region under a window display mode.

The window region refers to a partial region in a liquid crystal display needing to display target content. The window region is smaller than the entire display region of the liquid crystal display, and is a rectangle usually. The target content may be system time, short message notification, or the like.

In step 902, acquiring and/or obtaining position information of each backlight is acquired.

The position information of each row backlight and column backlight are acquired through a backlight circuit, which facilitates controlling a row backlight and a column backlight having an intersection with the window region to emit light.

In step 903, controlling a backlight having an intersection with the window region to emit light according to the position information of the window region and the position information of each backlight.

The backlight corresponding to the position of the backlight having an intersection with the window region is controlled to emit light according to the position information of the window region and the position information of each backlight.

In step 904, controlling a backlight with a position having no intersection with the window region in an off state.

The backlight may be a single backlight, and/or a backlight in a row backlight string, and/or a backlight in a column backlight string.

Because neither the row backlight strings nor the column backlight strings having an intersection with the window region, there is no need to operate these backlights and/or backlight strings. The backlight circuit accordingly sets the backlights and/or the row backlight strings and/or the column backlight string having no intersection with the window region into an off state.

In conclusion, according to the display method provided by the embodiment of present disclosure, the position information of the window region is acquired; the position information of each backlight is acquired; and the backlight having an intersection with the window region is controlled to emit light according to the position information of the window region and the position information of each backlight; therefore, a power waste problem caused by that both the scanning line and the data line in a non-window region are all in a operating state under the window display mode is solved, and the effect of only making the scanning line and the data line having an intersection with the window region in a operating state under the window display mode is achieved, thus reducing the power consumption.

It should be noted that the display method shown in the exemplary embodiment of the present disclosure may be applied to the terminal including the liquid crystal driver circuit as shown in FIG. 3, or, in the terminal including the backlight circuit as shown in FIG. 7, or in the terminal including both the liquid crystal driver circuit as shown in FIG. 3 and the backlight circuit as shown in FIG. 7.

Embodiments of devices of the present disclosure are described hereinafter, which may be used for performing embodiments of methods of the present disclosure. For the details not described in the embodiments of devices of the present disclosure, please refer to the embodiments of methods of the present disclosure.

Figure 10:
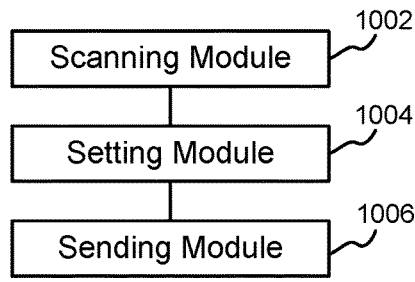
FIG. 10 is a block diagram of a display device, according to an exemplary embodiment.

FIG. 10 is a block diagram of a display device, according to an exemplary embodiment. The display device may be implemented in terminal including the liquid crystal driver circuit as shown in FIG. 3. The display device may include: a scanning module 1002, a setting module 1004, and a sending module 1006.

The scanning module 1002 is configured to send a scanning voltage to a scanning line having an intersection with a window region through a scanning driver chip under a window display mode;

The setting module 1004 is configured to set a data line switch corresponding to a data line having no intersection with the window region into an off state; and The sending module 1006 is configured to send a gray-scale voltage to the data line having an intersection with the window region through the data driver chip.

In conclusion, according to the display device provided by the embodiment of present disclosure, the scanning voltage is sent to the scanning line having an intersection with the window region through the scanning driver chip under the window display mode; the data line switch corresponding to the data line having no intersection with the window region is set into the off state; and the gray-scale voltage is sent to the data line having an intersection with the window region through the data driver chip; therefore, a power waste problem caused by that both the scanning line and the data line of a non-window region are all in a operating state under the window display mode is solved, and the effect of only making the scanning line and the data line having an intersection with the window region in a operating state under the window display mode is achieved, thus reducing the power consumption.

Figure 11:
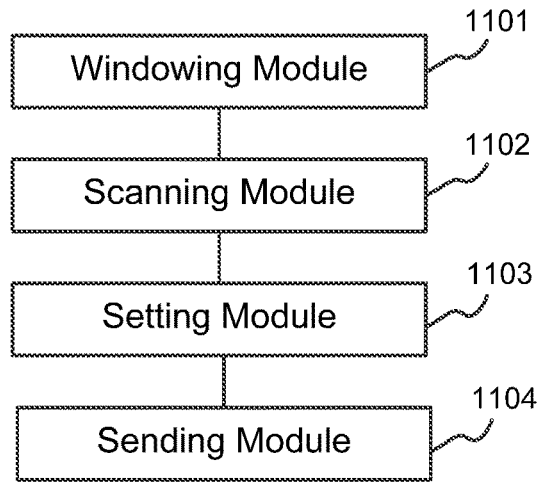
FIG. 11 is a block diagram of a display device, according to an exemplary embodiment.

FIG. 11 is a block diagram of a display device, according to an exemplary embodiment. The display device may be implemented in the terminal including the liquid crystal driver circuit as shown in FIG. 3. The display device may include a windowing module 1101, a scanning module 1102, a setting module 1103 and a sending module 1104.

The windowing module 1101 is configured to generate display content corresponding to a size of the window region under a windowing module.

The scanning module 1102 is configured to send a scanning voltage to a scanning line having an intersection with a window region through a scanning driver chip.

Under the window display mode, a DDIC reads a position of the window region, detects the scanning line having an intersection with the window region according to the position of the window region, and sends the scanning voltage to the scanning line having an intersection with the window region through the scanning driver chip.

For example, the DDIC controls an output start position and output times of the scanning voltage through the scanning driver chip.

The output start position is a scanning pin corresponding to a first first type scanning line having an intersection with the window region according to a sequence from top to bottom; and the output times is equal to the number of the scanning lines having an intersection with the window region.

The setting module 1103 is configured to seta data line switch corresponding to a data line having no intersection with the window region into an off state.

The sending module 1104 is configured to send a gray-scale voltage to the data line having an intersection with the window region through the data driver chip.

When a scanning line is in a scanned state, the DDIC may generate gray-scale voltages corresponding to each data line according to content to be displayed with regard to a row of liquid crystal units corresponding to this scanning line, and send a gray-scale voltage to the data line having an intersection with the window region through the data driver chip, so as to display the display content of this row.

In conclusion, according to the display device provided by the embodiment of present disclosure, the scanning voltage is sent to the scanning line having an intersection with the window region through the scanning driver chip under the window display mode; the data line switch corresponding to the data line having no intersection with the window region is set into the off state; and the gray-scale voltage is sent to the data line having an intersection with the window region through the data driver chip; therefore, a power waste problem caused by that both the scanning line and the data line of a non-window region are all in a operating state under the window display mode is solved, and the effect of only making the scanning line and the data line having intersection with the window region in a operating state under the window display mode is achieved, thus reducing the power consumption.

Figure 12:
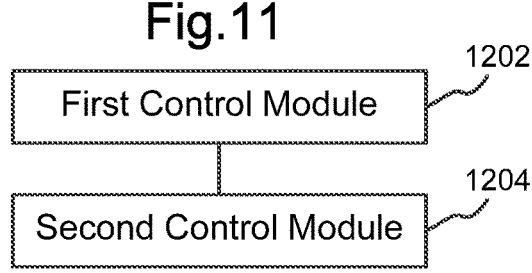
FIG. 12 is a block diagram of a display device, according to an exemplary embodiment of the present disclosure.

FIG. 12 is a block diagram of a display device, according to an exemplary embodiment of the present disclosure. The display device may be implemented in the terminal including the backlight circuit as shown in FIG. 7. The device includes a first control module 1202 and a second control module 1204.

The first control module 1202 is configured to control a backlight with a position having an intersection with a window region to emit light under a window display mode.

The second control module 1204 is configured to control a backlight with a position having no intersection with the window region to be in an off state.

The backlight is a single backlight, and/or a backlight in a row backlight string, and/or a backlight in a column backlight string.

In conclusion, according to the display device provided by the embodiment of present disclosure, the backlight with the position intersected with the window region is controlled to emit light under the window display mode; and the backlight with the position not intersected with the window region is controlled in an off state; therefore, a power waste problem caused by that both the scanning line and the data line of a non-window region are all in a operating state under the window display mode is solved, and the effect of only making the scanning line and the data line having intersection with the window region in a operating state under the window display mode is achieved, thus reducing the power consumption.

Figure 13:
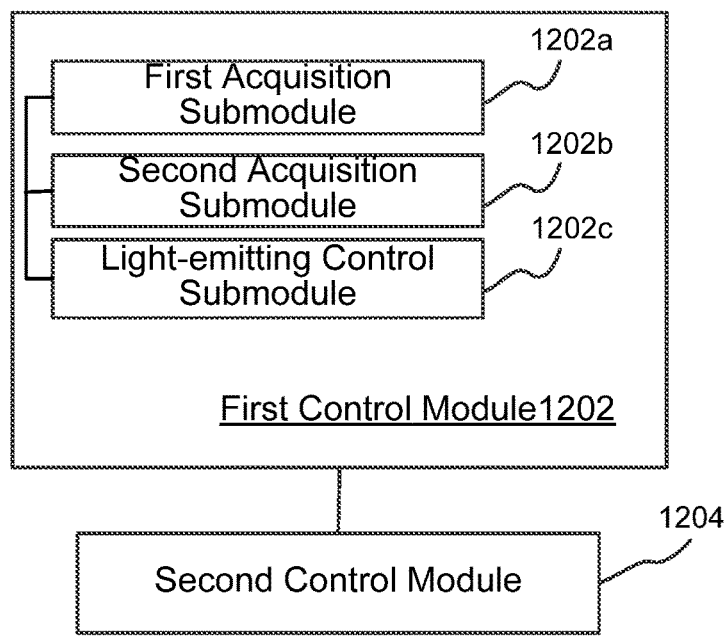
FIG. 13 is a block diagram of a display device, according to an exemplary embodiment of the present disclosure.

FIG. 13 is a block diagram of a display device, according to an exemplary embodiment of the present disclosure. The display device may be implemented in the terminal including the backlight circuit as shown in FIG. 7. The device includes a first control module 1202 and a second control module 1204.

The first control module 1202 is configured to control a backlight with a position having an intersection with a window region to emit light under a window display mode.

In the embodiment, the first control module 1202 may include: a first acquisition submodule 1202a, a second acquisition submodule 1202b, and a light-emitting control submodule 1202c.

The first acquisition submodule 1202a is configured to acquire position information of the window region.

The second acquisition submodule 1202b is configured to acquire position information of each backlight.

The light-emitting control submodule 1202c is configured to control a backlight having an intersection with the window region to emit light according to the position information of the window region and the position information of each backlight.

The second control module 1204 is configured to control a backlight with a position having no intersection with the window region to be in an off state.

The backlight is a single backlight, and/or a backlight in a row backlight string, and/or a backlight in a column backlight string.

In conclusion, according to the display device provided by the embodiment of present disclosure, the position information of the window region is acquired; the position information of each backlight is acquired; and the backlight having an intersection with the window region is controlled to emit light according to the position information of the window region and the position information of each backlight; therefore, a power waste problem caused by that both the scanning line and the data line of a non-window region are all in a operating state under the window display mode is solved, and the effect of only making the scanning line and the data line having intersection with the window region in a operating state under the window display mode is achieved, thus reducing the power consumption.

It should be noted that the display device shown in the exemplary embodiment of the present disclosure may be applied to the terminal including the liquid crystal driver circuit as shown in FIG. 3, or, in the terminal including the backlight circuit as shown in FIG. 7, or in the terminal including both the liquid crystal driver circuit as shown in FIG. 3 and the backlight circuit as shown in FIG. 7.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A liquid crystal driver circuit, comprising:
   a data driver chip including n data pins;
   a screen including a plurality of liquid crystal units distributed as an array, wherein each liquid crystal unit includes a liquid crystal pixel electrode and a TFT (thin film transistor) switching element, and the screen including:
   m rows of liquid crystal units along a row direction, and
   n columns of liquid crystal units along a column direction,
   wherein m is an integer and n is an integer;
   wherein the screen is configured to display a target content within a window region in the screen including k rows of liquid crystal units and j columns of liquid crystal units;
   a first type of j data lines respectively connecting the j columns of liquid crystal units in the window region directly to corresponding j data pins of the data driver chip, wherein each of the first type of j data lines includes a data line switch simultaneously in a close state to be configured to provide a current signal to the liquid crystal units included in the window region;
   a second type of n−j data lines respectively coupled to n−j columns of liquid crystal units outside the window region, wherein each of the second type of n−j data lines include a data line switch configured in an open-off state to prevent the current signal from being provided to the liquid crystal units outside the window region, and the second type of n−j data lines comprises at least two groups of data lines separated by at least one data line of the first type of j data lines;
   wherein the data driver chip is configured to:
   determine the first type of j data lines corresponding to portions of the screen within the window region based on a window size of the window region;
   determine the second type of n−j data lines corresponding to portions of the screen outside the window region based on the window size of the window region; and
   transmit a display signal to the first type of j data lines;
   a plurality of row backlights distributed in a row border region of a liquid crystal display;
   a plurality of column backlights distributed in a column border region of the liquid crystal display; and
   wherein:
   at least two row backlights with their positions having an intersection with the window region, based on the window size and location of the window region, are connected in series to form a row backlight string, and
   at least two column backlights with their positions having an intersection with the window region, based on the window size and location of the window region, are connected in series to form a column backlight string.

2. The liquid crystal driver circuit according to claim 1, wherein each of the n columns of liquid crystal units includes a drain connected to a data line of either the first type of j data lines or second type of n−j data lines.

3. The liquid crystal driver circuit according to claim 1, further comprising m scanning lines respectively connected to the m rows of liquid crystal units along the row direction.

4. The liquid crystal driver circuit according to claim 3, further comprising a scanning driver chip including m scanning pins, each of which connected to a corresponding one of the m scanning lines.

5. The liquid crystal driver circuit according to claim 3, wherein each of the liquid crystal units comprises a gate connecting to one of the m scanning lines.

6. The liquid crystal driver circuit according to claim 1, wherein the TFT switching element comprises a source, a gate, and a drain.

7. The liquid crystal driver circuit according to claim 1, wherein along the column direction all of the row backlights of each row backlight string either intersect with the window region or do not intersect with the window region.

8. The liquid crystal driver circuit according to claim 1, wherein along the row direction all of the column backlights of each column backlight string either intersect with the window region or do not intersect with the window region.

9. The liquid crystal driver circuit according to claim 1, wherein when the n−j data line switches are configured in an open-off state, the n−j date lines are in a non-operating state and cannot receive a gray-scale voltage sent from the data driver chip, and when the n−j data line switches are configured in an closed-on state, the n−j date lines are in an operating state and can receive the gray-scale voltage sent from the data driver chip.

10. The liquid crystal driver circuit according to claim 1, wherein the target content is one of a system time display or a message notification.

11. A method for displaying an image on a screen of a terminal, wherein the terminal comprises:
the screen including a plurality of liquid crystal units distributed as an array of m rows of liquid crystal units along a row direction and n columns of liquid crystal units along a column direction, wherein m is an integer and n is an integer, wherein each liquid crystal unit includes a liquid crystal pixel electrode and a TFT (thin film transistor) switching element;
wherein the screen is configured to display a target content within a window region in the screen including j columns of liquid crystal units and k rows of liquid crystal units;
a data driver chip including n data pins;
a first type of j data lines respectively connecting the j columns of liquid crystal units in the window region directly to corresponding j data pins of the data driver chip, wherein each of the first type of j data lines includes a data line switch simultaneously in a close state to be configured to provide a current signal to the liquid crystal units included in the window region;
a second type of n−j data lines respectively coupled to n−j columns of liquid crystal units outside the window region, wherein each of the second type of n−j data lines include a data line switch configured in an open position to prevent the current signal from being provided to the liquid crystal units outside the window region and the second type of n−j data lines comprises at least two groups of data lines separated by at least one data line of the first type of j data lines;
a plurality of row backlights distributed in a row border region of a liquid crystal display;
a plurality of column backlights distributed in a column border region of the liquid crystal display, wherein:
at least two row backlights with their positions having an intersection with the window region, based on a window size and location of the window region, are connected in series to form a row backlight string, and
at least two column backlights with their positions having an intersection with the window region, based on the window size and location of the window region, are connected in series to form a column backlight string; and
the method comprising:
determining, by the data driver chip, the first type of j data lines corresponding to portions of the screen within the window region based on the window size of the window region;
determining, by the data driver chip, the second type of n−j data lines corresponding to portions of the screen outside the window region based on the window size of the window region; and
transmitting, by the data driver chip, a display signal to the first type of j data lines.

12. The method according to claim 11, wherein the terminal further comprises a first type of k scanning lines respectively connected to the k rows of liquid crystal units in the window region;
a second type of m−k scanning lines respectively connected to m−k rows of liquid crystal units outside the window region; and
a scanning driver chip including m scanning pins, each of which connected to a corresponding one of m scanning lines; and
wherein the method further comprises:
sending, by the scanning driver chip, a scanning voltage to each of the k first type of scanning lines;
setting, by the data driver chip, the n−j data line switches to an off state; and
to each of the j first type of data lines, sending, by the data driver chip, a gray-scale voltage;
wherein the sending of the scanning voltage comprises:
controlling an output start position on the screen and output times of the scanning voltage,
wherein the output start position is a scanning pin corresponding to a first type scanning line according to a sequence from top to bottom of the k rows of liquid crystal units in the window region, and
wherein the output times equal k.

13. The method according to claim 11, wherein the terminal further comprises a first type of k scanning lines respectively connected to the k rows of liquid crystal units in the window region;
a second type of m−k scanning lines respectively connected to m−k rows of liquid crystal units outside the window region; and
a scanning driver chip including m scanning pins, each of which connected to a corresponding one of m scanning lines; and
wherein the method further comprises:
sending, by the scanning driver chip, a scanning voltage to each of the k first type of scanning lines;
setting, by the data driver chip, the n−j data line switches to an off state; and
to each of the j first type of data lines, sending, by the data driver chip, a gray-scale voltage;

wherein the sending of the gray-scale voltage comprises:
  generating display content corresponding to the size of the window region; and
  sending the gray-scale voltage corresponding to the display content to each of the first type of j data lines.

14. The method of claim 11, wherein the target content is one of a system time display or a message notification.

* * * * *